United States Patent [19]

Dold

[11] 4,291,313
[45] Sep. 22, 1981

[54] RECORDING APPARATUS

[75] Inventor: Berthold Dold, Schramberg, Fed. Rep. of Germany

[73] Assignee: Kienzle Apparate GmbH, Villingen, Fed. Rep. of Germany

[21] Appl. No.: 140,747

[22] Filed: Apr. 16, 1980

[30] Foreign Application Priority Data

Apr. 28, 1979 [DE] Fed. Rep. of Germany ....... 2917329

[51] Int. Cl.³ .............................................. G01D 9/00
[52] U.S. Cl. .................................................. 346/68
[58] Field of Search ......................... 346/68, 123, 145

[56] References Cited

U.S. PATENT DOCUMENTS 2,873,163  2/1959  Panich .................................. 346/68
3,735,040  5/1973  Punt et al. ........................ 346/68 X

FOREIGN PATENT DOCUMENTS 27301 of 1910 United Kingdom .................. 346/68

Primary Examiner—George H. Miller, Jr.
Attorney, Agent, or Firm—Toren, McGeady and Stanger

[57] ABSTRACT

Recording apparatus includes a planar support for supporting a flat recording medium such as one or more circular graph sheets. At least one recording instrument, e.g., a wire pen, is arranged to be movable relative to the support to provide a recording on the recording medium when the instrument is moved into contact with the medium and the medium is driven at a given rate. A lid is provided for covering the recording medium, the lid being arranged for pivotal movement about a hinge axis between open and closed positions relative to the support. The lid also serves to move the recording instrument into contact with the recording medium when it is in the closed position, and to lift the recording instrument out of contact from the recording medium when in the open position. A movable, guide part contacts the recording instrument to lift the instrument out of contact from the recording medium when the lid is moved to the open position. A drive arrangement is provided between the lid and the guide part to provide lifting movement to the guide part when the lid is pivoted toward the open position, so that the recording instrument is firmly supported out of contact with the recording medium and cannot be tampered with to make false recordings while the lid is open.

9 Claims, 5 Drawing Figures

PL-2282.2

RECORDING APPARATUS

BACKGROUND OF THE INVENTION

The present invention relates to recording apparatus wherein graph sheets are used as a recording medium to record information, the sheets being moved at a certain rate in accordance with the passage of time. At least one recording instrument, such as a wire pen, is arranged to move in a plane parallel to that of the sheets which rest on the support. The recording apparatus also includes a lid which can be pivoted between closed and open positions to allow the sheets to be removed and replaced, and an arrangement which allows the recording instrument to be moved into and out of contact with the sheets as the lid is swung.

In recording apparatus of the above type, which is not generally designed as a tachograph wherein a recording instrument is arranged in one portion and a recording medium in another portion of two rotatably connected parts (a lid and a housing), a problem arises in regard to removing or replacing the recording medium (e.g., graph sheets) without contacting the recording instrument. In cases where graph sheets are automatically evaluated, it is essential that inadvertent contact between the sheets and the recording instrument be avoided since markings or scratches by the instrument will give rise to errors in evaluation. On the other hand, damage of the recording instrument, especially to pen points, must be avoided since such points often include fine wire recording electrodes or jewels which are relatively brittle and subject to fracture.

It is known to provide one or more recording instruments with elastic parts to separate the instruments from the recording medium when the lid of recording apparatus is opened. It is also known to elastically mount the recording instruments themselves, or their supports, so that the instruments are automatically lifted from the recording medium when the lid is opened. In order to protect the recording points of the instruments, suitable shielding parts have been provided which present only a slotted opening through which the recording medium is introduced. When opening the lid of this apparatus, the recording instruments are tilted within the shields so that their recording points become inaccessible. When circular graph sheets are used as the recording medium, on which sheets recordings are made over most all of their entire radial extent, the shields and the centering and driving mechanism for the sheets are situated relatively close to one another. Accordingly, introducing the sheets beneath the shields is a rather complicated process. Improved handling in these cases is made possible by allowing the recording instruments to remain only partly covered.

In recording apparatus of the type wherein recording instruments are arranged between a recording medium and a swinging lid, and the instruments are relatively easily accessible, it is necessary to arrange the bearings and the guide mechanism for the recording instruments, and particularly their adjustment mechanisms, so that they cannot be tampered with in order to reduce the danger of unauthorized manipulation.

The known recording apparatus has not proven to be fully satisfactory, especially in those cases where the recording medium is to serve as an important document. For example, a high degree of security is required when the apparatus is used as a tachograph, where it is essential that the recordings must not be falsified. However, when the lids of the known apparatus are opened, the recording instruments can be moved manually, either directly or by way of operating parts connected to the lid, onto the recording medium. Then, by moving the recording medium in its normal driven direction, recordings can be simulated.

An object of the present invention is to overcome the above disadvantages of the known recording apparatus so that the recording instruments cannot be brought to their normal recording positions when the lid of the apparatus is opened, and to provide secure recording apparatus which can be produced and operated at minimum cost.

In accordance with the present invention, a recording apparatus comprises a planar support for supporting a recording medium. At least one recording instrument is arranged to be movable relative to the support to provide a recording on the medium when the instrument is moved into contact with the medium, and the medium is driven at a given rate. A lid for covering the recording medium is arranged for pivotal movement about a hinge axis, between open and closed positions relative to the support, to move the recording instrument into contact with the recording medium when the lid is in the closed position, and to lift the instrument out of contact from the medium when the lid is in the open position. A movable guide part contacts the recording instrument to lift it out of contact from the recording medium when the lid is moved to the open position. A drive arrangement between the lid and the guide part lifts the guide part as the lid is pivoted toward the open position, so that the recording instrument is held at a position out of contact with the recording position.

In a preferred embodiment, the lid has a projecting hinge part through which the hinge axis extends. This hinge part has a cam surface on its periphery which surface extends arcuately about the hinge axis and rotates about the hinge axis when the lid is opened and closed. The drive arrangement which includes the hinge part, also includes an elongated lever which is pivotally supported between its ends. The guide part contacts one arm of the lever, and one end of an elongated rod contacts the other arm of the lever. A roller is arranged between the other end of the rod and the cam surface on the hinge part.

Preferably, the recording apparatus also includes a pivotally movable shield for protectively covering the recording instrument, the shield being operatively associated with the lever. One or more connecting members may then be arranged between the shield and the recording instrument to move the instrument out of contact with the recording medium when the shield is raised above the instrument by the lever.

Aside from fulfilling the objects of the invention, the present recording apparatus offers security against unauthorized manipulation of the recording instrument. The elements of the drive arrangement between the lid and the recording instrument are of simple form and easily engage one another during operation. Operating safety is thereby improved while manufacturing and installation costs are reduced, since wide tolerances can be allowed. When a shield in the form of a hood is used for the recording instrument, it is desirable that the shield be made in such a manner that it be raised above the recording medium together with the recording instrument. Also, the shield itself may serve as a driving element for the recording instrument which can be lifted by a rigid member connected between the shield and the instrument.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE INVENTION

Figure 1:
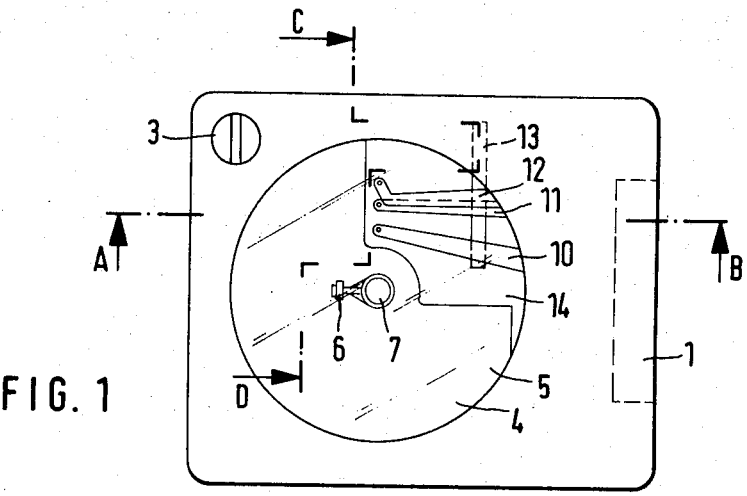
FIG. 1 is a view of a recording apparatus according to the present invention.

FIG. 1 shows recording apparatus including a lid 1 which is pivotally connected at one side to a housing 2 (see FIGS. 2 and 5) of the recording apparatus by way of a hinged connection which will be described in detail below. The lid 1 can be locked to the housing 2 by way of a lock 3. When the recording apparatus is used, for example, to record data relating to industrial production such as machine operating times or production figures, or to record transportation data as a tachograph, it is preferable that the lid 1 be provided with a viewing window 4 so that the operation of recording instruments in the apparatus may be easily checked, and recorded data can be readily ascertained and used.

A recording medium, usually in the form of a circular graph sheet or a stack 5 of such sheets, is secured about a centering and driving element 7 by way of a tilting lever 6 or other suitable fastening means. A driving mechanism 8 (FIG. 5) operates to rotate a recording medium support disk 9 at a certain rate corresponding to the passage of time.

Figure 5:
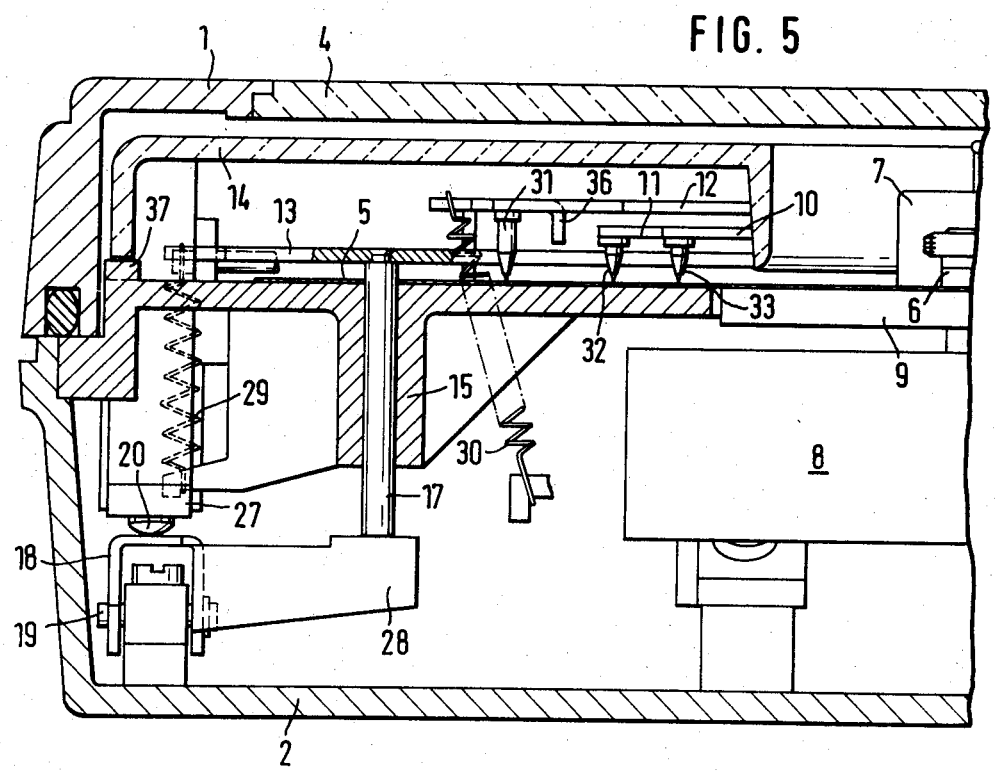
FIG. 5 is an enlarged, partial sectional view taken along line C-D in FIG. 1.

As shown in FIG. 5, three recording instruments in the form of flat levers 10,11 and 12 are provided in the recording apparatus, these levers having recording points which are movable in the radial direction of the graph sheets 5 in corresponding parallel recording planes. The levers 10,11 and 12 are also rotatable about an axis parallel to the recording planes upon movement of a guide part 13. A covering element or shield 14 protects the recording instrument 10,11 and 12 from being manipulated while the lid 1 is open.

In place of the recording instruments 10,11 and 12, other recording instruments may be provided depending upon the particular recording process being used. For example, a comb of electrodes, a magnetic recording comb, or a single recording instrument which is continuously moved radially back and forth over the graph sheets 5 and which is lowered and raised relative to the sheets to effect recording in several tracks may also be used.

Figure 2:
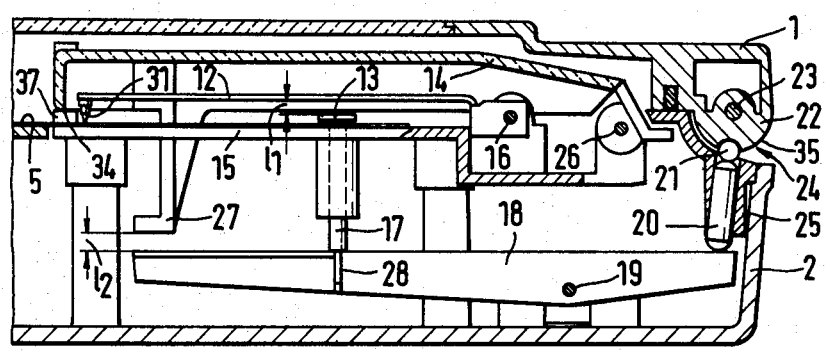
FIG. 2 is an enlarged, partial sectional view taken along line A-B in FIG. 1.

FIG. 2 shows a support 15 for supporting the stack 5 of graph sheets and providing a guide surface for the sheets, the support being fixed within the housing 2. The recording instruments 10,11 and 12 are arranged for pivotal movement about axle shafts which are held in the support 15, only one of these shafts 16 being shown in FIG. 2. An enlongated bar 17 is guided for sliding movement in its long direction by the support 15, and one end of the bar 17 is fixed to the guide part 13. The other end of the bar 17 contacts a lug 28 which extends from one arm of a lever 18, the lever 18 being supported at 19 for pivotal movement within the housing 2. A projection 22 extends from the hinged connection of the lid 1 to the housing 2. Projection 22 has a cam surface 24 formed on its periphery, the surface 24 extending arcuately about hinge shaft 23. Cam surface 24 serves to pivot the lever 18 by way of an elongated rod 20 one end of which remains in contact with a roller 21 as the lid 1 is opened. The other end of the rod 20 engages the other arm of lever 18 while the roller 21 engages the cam surface 24. Rod 20 is guided for sliding movement in its long direction by a guide part 25 which is fixed within the housing 2 and which also serves to support the ends of the hinge shaft 23 (not shown). Also, the shield 14, which is in the form of a hood for covering the recording instruments, is pivoted for rotational movement by way of elongated pins 26 fixed to the support 15 (only one pin 26 is shown). Shield 14 has a foot part 27 which extends through an opening in the support 15. Foot part 27 has an end surface which faces toward the arm of the lever 18 which contacts the bar 17.

As shown in FIG. 5, a spring 29 may be arranged to act at one end of the guide part 13 to ensure positive engagement of the members of the drive arrangement between the guide part 13 and the lid 1 as the lid is opened. Another spring 30 may be arranged, for example, to provide proper recording pressure for the recording instrument 12. The drive arrangement can also be simplified by employing a single coupling element between the cam surface 24 and the lever 18. Also, cam surface 24 can be provided on a cam body which is adjustably movable relative to the hinged part of the lid 1.

Operation of the recording apparatus according to the present invention will now be explained.

FIG. 2 shows essential operating parts of the apparatus when the lid 1 is closed and the apparatus is in a condition where one or more recordings can be made by the recording instrument (only instrument 12 being shown). As the lid 1 is opened, the cam surface 24 urges the roller 21 against the rod 20, thereby pivoting the lever 18 about its axis at 19. Cam surface 24 has a detent for receiving the roller 21 when the lid 1 is closed. As the lid 1 is opened and the roller 21 displaces the rod 20 to pivot the lever 18, lever 18 then moves bar 17 so that the guide part 13 is lifted a distance $L_1$ into contact with the recording instruments. Guide part 13 thereafter raises the recording instruments off the graph sheets 5 as the lid 1 is opened fully.

Figure 3:
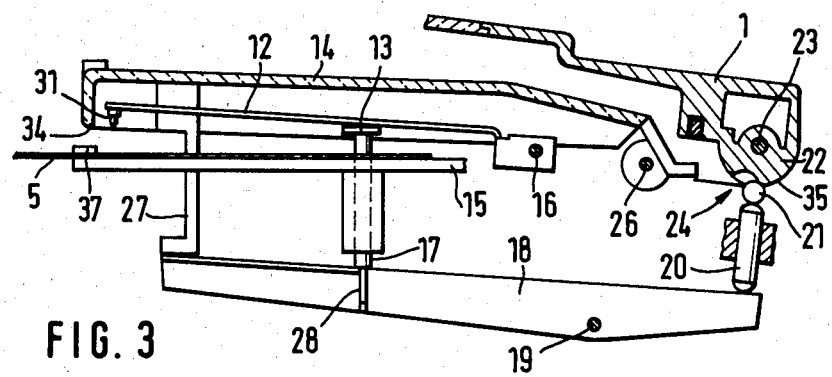
FIG. 3 is a sectional view, similar to FIG. 2, showing a first operational condition of the drive arrangement in the apparatus.

A lug 36 (FIG. 5) on the recording instrument 12 contacts the guide part 13 so that the instrument 12 is raised in unison with the instruments 10,11 when they are directly contacted by the guide part 13. By this movement, the recording points 31,32 and 33 of the recording instruments 10, 11 and 12 are brought behind an edge or lip 34 on the shield 14, these positions of the instruments being shown in FIG. 3. Further, the arm of the lever 18 closer to the foot part 27 of the shield 14 moves through a distance $L_2$ to contact the foot part 27.

Figure 4:
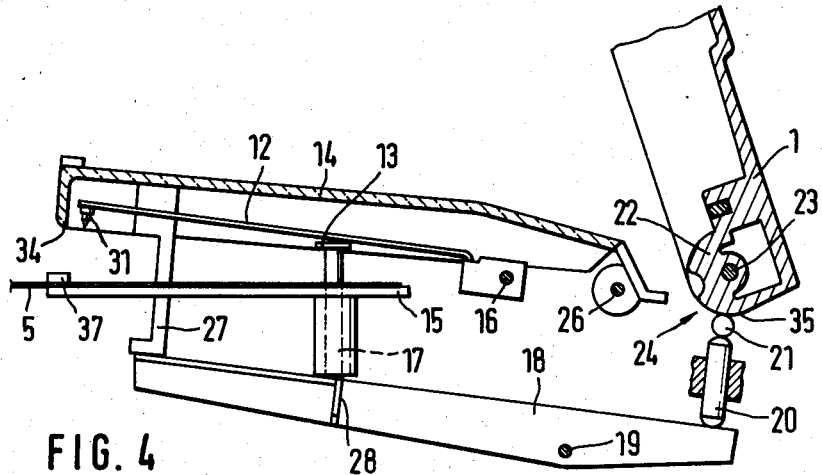
FIG. 4 is a view similar to FIG. 2, showing a second operational condition of the drive arrangement.

Accordingly, as the shield 14 is raised by the lever 18, the recording points 31,32 and 33 are well guarded behind the lip 34 of the shield 14. These relative movements between the recording instruments 10,11 and 12, the shield 14 and lever 18 can be coordinated within required limits by suitably choosing the distances between the pivot axes of the recording instruments, the pivot axis of the lever 18, and the pivot axis of the shield 14. The points of engagement of the foot part 27, and the bar 17 with the lever 18 can also be suitably chosen to achieve the desired operating movements. When the lid 1 is swung to the position shown in FIG. 4, the cam surface 24 engages the roller 21 at a point 35 on the surface, and the recording instruments 10,11 and 12 remain stationary relative to the shield 14 as the lid 1 is swung further open. The shield 14 can be secured by one or more suitable stops against being raised further by hand.

In accordance with the construction and operation of the present recording apparatus, graph sheets can be removed and inserted without any problem, and the points of the recording instruments are fully guarded against damage at such times. Further, the recording instruments are locked against downward movement toward the graph sheets while the lid of the apparatus is open, so that the alterations of the recordings by the recording instruments are practically impossible to make during such time.

It should be noted that when the lid 1 is closed, the shield 14, which is not directly connected with the guide part 13 and the cam surface 24, is returned against a stop 37 by way of the lid 1. For this purpose, it is desirable that an elastic layer (not shown) be provided between the lid 1 and the shield 14.

While specific embodiments of the invention have been shown and described in detail to illustrate the application of the inventive principles, it will be understood that the invention may be embodied otherwise without departing from such principles.

What is claimed is:

1. Recording apparatus comprising a planar support for supporting a recording medium, means for driving the recording medium at a given rate, at least one recording instrument arranged to be movable relative to said support for providing a recording on the recording medium when said recording instrument is moved into contact with the recording medium and the recording medium is driven, a lid for covering the recording medium wherein said lid is arranged for pivotal movement about a hinge axis which extends parallel to said planar support between open and closed positions relative to said support to move said recording instrument into contact with the recording medium when said lid is in said closed position and to raise said recording instrument out of contact from the recording medium when said lid is in said open position, a guide part which is movable into contact with said recording instrument to raise said recording instrument out of contact from the recording medium when said lid is moved toward said open position, and drive means between said lid and said guide part for providing movement to said guide part when said lid is pivoted from said closed position toward said open position so that said recording instrument is held in a fixed position out of contact from the recording medium.

2. Recording apparatus according to claim 1, wherein said lid has a hinge part through which said hinge axis extends, said hinge part having a cam surface on its periphery wherein said cam surface extends arcuately about said hinge axis and rotates about said hinge axis when said lid is pivoted, and said drive means includes said hinge part.

3. Recording apparatus according to claim 2, wherein said hinge part projects from and is integral with said lid.

4. Recording apparatus according to claim 1, wherein said drive means comprises an elongated lever which is supported between its ends for pivotal movement, said guide part contacting one arm of said lever, a rod one end of which is in contact with the other arm of said lever, and a roller arranged between the other end of said rod and said cam surface wherein said roller displaces said rod so that said lever pivots when said lid is pivoted toward said open position.

5. Recording apparatus according to claim 1, wherein said drive means is arranged to positively engage said lid and said guide part when said lid is pivoted toward said open position.

6. Recording apparatus according to claim 4, including a pivotally movable shield for protectively covering said recording instrument, said shield being operatively associated with said lever.

7. Recording apparatus according to claim 6, including a connecting foot part for transferring movement between said shield and said lever, and means for adjusting the position of said connecting foot part relative to said lever.

8. Recording apparatus according to claim 2, wherein said hinge part includes a cam body which defines said cam surface and said cam body is arranged to be adjustably movable with respect to the remainder of said hinge part.

9. Recording apparatus comprising a planar support for supporting a flat recording medium, means for driving the recording medium at a given rate, at least one recording instrument arranged to be movable relative to said support for providing a recording on the recording medium when said recording instrument is moved into contact with the recording medium and the recording medium is driven, a lid for covering the recording medium wherein said lid is arranged for pivotal movement about a hinge axis which extends parallel to said planar support between open and closed positions relative to said support to move said recording instrument into contact with the recording medium when said lid is in said closed position and to raise said recording instrument out of contact with the recording medium when said lid is in said open position, a shield arranged for pivotal movement of protectively covering said recording instrument, coupling means arranged between said shield and said recording instrument for raising said recording instrument out of contact from the recording medium when said shield is pivoted in the direction away from the recording medium, and drive means between said lid and said shield for providing movement to said shield when said lid is pivoted from said closed position toward said open position so that said recording instrument is held in a fixed position out of contact from the recording medium.

* * * * *